(12) United States Patent
Hong et al.

(10) Patent No.: US 10,191,198 B2
(45) Date of Patent: Jan. 29, 2019

(54) DISPLAY APPARATUS INCLUDING DIRECTIONAL BACKLIGHT UNIT AND METHOD OF ASSEMBLING THE DISPLAY APPARATUS

(71) Applicant: SAMSUNG ELECTRONICS CO., LTD., Suwon-si (KR)

(72) Inventors: Seogwoo Hong, Yongin-si (KR); Dongsik Shim, Hwaseong-si (KR); Dongouk Kim, Pyeongtaek-si (KR); Hyunjoon Kim, Seoul (KR); Joonyong Park, Suwon-si (KR); Jihyun Bae, Seoul (KR); Bongsu Shin, Seoul (KR); Sunghoon Lee, Seoul (KR); Jaeseung Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/351,950

(22) Filed: Nov. 15, 2016

(65) Prior Publication Data

US 2017/0205554 A1   Jul. 20, 2017

(30) Foreign Application Priority Data

Jan. 15, 2016 (KR) .......................... 10-2016-0005454

(51) Int. Cl.
*G02B 26/08* (2006.01)
*F21V 8/00* (2006.01)
*H04N 13/39* (2018.01)
*B29C 65/48* (2006.01)
*G02B 27/22* (2018.01)
*H04N 13/32* (2018.01)
*B29L 31/34* (2006.01)

(52) U.S. Cl.
CPC ............ *G02B 6/0031* (2013.01); *B29C 65/48* (2013.01); *G02B 6/0038* (2013.01); *G02B 6/0065* (2013.01); *G02B 6/0068* (2013.01); *G02B 6/0088* (2013.01); *G02B 27/22* (2013.01); *H04N 13/32* (2018.05); *H04N 13/39* (2018.05); *B29L 2031/3475* (2013.01); *H04N 2213/001* (2013.01)

(58) Field of Classification Search
CPC .. G02B 6/0031; G02B 6/0038; G02B 6/0088; G02B 27/22; G02B 6/0065; G02B 6/0068; H04N 13/39; H04N 13/049; B29C 65/48; B29L 2031/3475
See application file for complete search history.

(56) References Cited

U.S. PATENT DOCUMENTS 8,197,113 B2    6/2012  Park et al.
9,557,466 B2 *  1/2017  Fattal ................... G02B 6/0068
2004/0109244 A1* 6/2004  Kokogawa ........... G02B 5/1866
                                                          359/831

(Continued)

FOREIGN PATENT DOCUMENTS

KR   10-2009-0055770 A    6/2009
KR   10-2009-0128210 A   12/2009
KR   10-2013-0015792 A    2/2013

*Primary Examiner* — Tracie Y Green
(74) *Attorney, Agent, or Firm* — Sughrue Mion, PLLC

(57) ABSTRACT

A display apparatus including a directional backlight unit and a method of assembling the display apparatus are disclosed. The display apparatus includes an auxiliary structure coupled to an input coupler and a switch panel module.

17 Claims, 6 Drawing Sheets

(56) References Cited

U.S. PATENT DOCUMENTS

| | | |
|---|---|---|
| 2009/0303409 A1 | 12/2009 | Park |
| 2013/0038813 A1 | 2/2013 | Zhang |
| 2015/0117054 A1 | 4/2015 | Tai et al. |
| 2015/0138486 A1* | 5/2015 | Lee .......................... G02F 1/29 349/62 |
| 2017/0052312 A1 | 2/2017 | Jung et al. |
| 2017/0059961 A1 | 3/2017 | Park et al. |
| 2017/0168209 A1* | 6/2017 | Shin ....................... G02B 6/005 |
| 2017/0176669 A1* | 6/2017 | Chung ................. G02B 5/1819 |
| 2017/0199420 A1* | 7/2017 | Shin .................. G02F 1/133504 |
| 2017/0212359 A1* | 7/2017 | Kim .................. G02B 27/2214 |

\* cited by examiner

DISPLAY APPARATUS INCLUDING DIRECTIONAL BACKLIGHT UNIT AND METHOD OF ASSEMBLING THE DISPLAY APPARATUS

CROSS-REFERENCE TO RELATED APPLICATIONS

This application claims priority to Korean Patent Application No. 10-2016-0005454, filed on Jan. 15, 2016, in the Korean Intellectual Property Office, the disclosure of which is incorporated herein in its entirety by reference.

BACKGROUND

1. Field

The present disclosure relates to a display apparatus including a directional backlight unit and a method of assembling the display apparatus.

2. Description of the Related Art

Three-dimensional (3D) display technology is used to display 3D images. The basic principle of this technology is providing an image for the left eye and an image for the right eye, which have different points of view, to a viewer, thereby enabling the viewer to perceive a 3D effect due to binocular disparity. To implement the 3D technology, a glass method and a glassless method are largely used. The glass method includes a red-green glass method, a liquid crystal shutter glass method, a polarizing glass method, and the like according to techniques of displaying different images to two eyes. The glassless method includes a lenticular method, a parallax barrier method, and the like and also includes, according to techniques of generating images, a multi-view rendering method, a volumetric method of displaying all information of a 3D space as voxels in the 3D space, an integral imaging method of capturing images at several angles, the images being formed through a lens having a shape of compound eyes (fly eyes) of an insect, and inversely displaying the captured images, a holographic method, a directional backlight method, and the like.

The directional backlight method is a technique of generating a 3D image by using a directional backlight unit in which minute lattices for respectively providing directional light to a plurality of points of view of a 3D image are formed on a surface of a light-guide plate so as to provide light in a desired direction for each pixel of a 3D display.

To manufacture a 3D display including a directional backlight unit, it is necessary to assemble a light-guide plate for making light uniform and a switch panel module for generating a 3D image.

SUMMARY

Provided are a display apparatus including a directional backlight unit, wherein a light-guide plate and a switch panel module are assembled in the display apparatus without affecting total internal reflection on the light-guide plate, and a method of assembling the display apparatus.

Additional aspects will be set forth in part in the description which follows and, in part, will be apparent from the description, or may be learned by practice of the presented exemplary embodiments.

According to an aspect of an exemplary embodiment, a display apparatus includes: a switch panel module; a backlight unit comprising a light source, a light-guide plate configured to guide light from the light source through total internal reflection, an array of diffraction lattice elements provided on an upper surface of the light-guide plate and configured to output light to the switch panel module through the upper surface, and an input coupler provided on a side surface of the light-guide plate, configured to input the light from the light source to the light-guide plate, and fixed to the light-guide plate so as to provide the light to the switch panel module; and an auxiliary structure coupled to the input coupler and the switch panel module and configured to assemble the switch panel module and the backlight unit.

The input coupler may include an inclined mirror surface inclined with respect to the upper surface of the light-guide plate so as to input the light from the light source to the light-guide plate by reflecting the light from the light source.

The light source may be disposed such that the light is incident to the inclined mirror surface of the input coupler from a lower direction of the backlight unit.

The auxiliary structure may have an inclined surface to be coupled to the inclined mirror surface.

The inclined mirror surface of the input coupler and the inclined surface of the auxiliary structure may be bonding-coupled by an adhesive.

The auxiliary structure may have, on an upper part thereof, an upper horizontal surface parallel to the switch panel module.

The upper horizontal surface of the auxiliary structure and a support part of the switch panel module may be bonding-coupled by an adhesive.

The upper horizontal surface of the auxiliary structure may be fixed to the support part of the switch panel module.

The input coupler may include an array of a plurality of input couplers on at least one side surface of the light-guide plate, each of the plurality of input couplers may include an inclined mirror surface inclined with respect to the upper surface, and the auxiliary structure may be configured to be coupled to the inclined mirror surface of at least some of the plurality of input couplers.

An array of an plurality of inclined surfaces inclined with respect to the upper surface may be provided on at least one side surface of the light-guide plate, and the input coupler may be an inclined mirror surface provided to each of the plurality of inclined surfaces forming the array.

The input coupler may include an array of a plurality of input couplers attached to at least one side surface of the light-guide plate, and each of the plurality of input couplers may have an inclined mirror surface inclined with respect to the upper surface of the light-guide plate.

The input coupler may have an inclined mirror surface inclined with respect to the upper surface of the light-guide plate, the auxiliary structure may have an inclined surface to be coupled to the inclined mirror surface and an upper horizontal surface to be coupled to the switch panel module, and the inclined surface of the auxiliary structure and the inclined mirror surface of the input coupler, and the upper horizontal surface of the auxiliary structure and the switch panel module may be bonding-coupled by an adhesive.

The upper horizontal surface of the auxiliary structure may be located at same height as the upper surface of the light-guide plate or located to protrude with respect to the upper surface of the light-guide plate.

The upper horizontal surface of the auxiliary structure may be fixed to the switch panel module, and the inclined surface of the auxiliary structure and the inclined mirror surface of the input coupler may be bonding-coupled by an adhesive.

The auxiliary structure may be coupled to the input coupler outside of a location where light reflected by the input coupler and incident to the inside of the light-guide plate first arrives at the upper surface of the light-guide plate.

According to an aspect of another exemplary embodiment, a method of assembling the display apparatus includes: fixing the auxiliary structure to the input coupler by bonding-coupling an inclined surface of the auxiliary structure to an inclined mirror surface of the input coupler by an adhesive so as to assemble the backlight unit and the switch panel module; applying an adhesive to an upper horizontal surface of the auxiliary structure; and fixing the switch panel module to the upper horizontal surface of the auxiliary structure by hardening the adhesive in a state of making a support part of the switch panel module approach the upper horizontal surface of the auxiliary structure.

According to an aspect of another exemplary embodiment, a method of assembling the display apparatus includes: applying an adhesive to an inclined mirror surface of the input coupler in a state of fixing an upper horizontal surface of the auxiliary structure to the switch panel module so as to assemble the backlight unit and the switch panel module; and fixing an inclined surface of the auxiliary structure to the inclined mirror surface of the input coupler by hardening the adhesive in a state of making the inclined surface of the auxiliary structure approach the inclined mirror surface of the input coupler.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
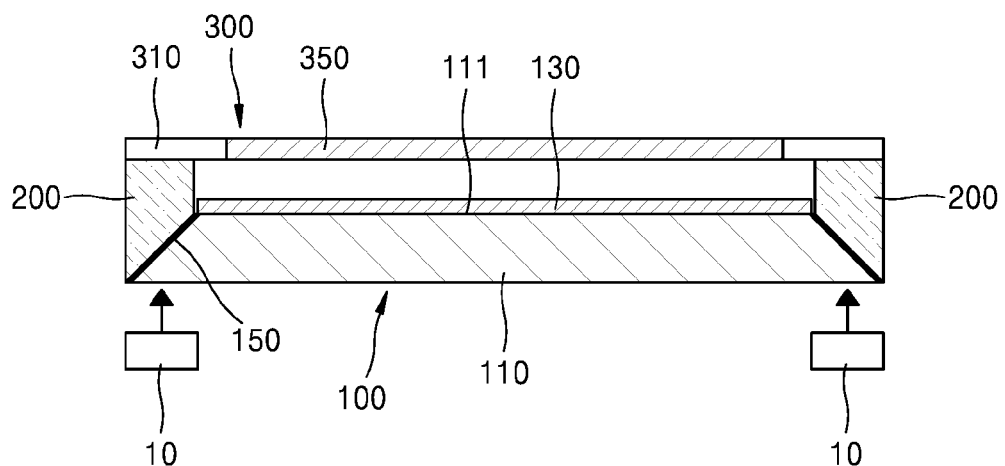
FIG. 1 illustrates a cross-sectional view of a display apparatus including a directional backlight unit, according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the exemplary embodiments. As used herein, expressions such as "at least one of," when preceding a list of elements, modify the entire list of elements and do not modify the individual elements of the list.

Hereinafter, a display apparatus employing a directional backlight unit, according to one or more exemplary embodiments, is described in detail with reference the accompanying drawings. Like reference numerals in the drawings denote like components, and the thicknesses or sizes of components may be exaggerated for convenience of description. In addition, the exemplary embodiments described below are only illustrative and various modifications may be formed from these exemplary embodiments.

In addition, in the layer structure described below, the expression "on an upper part" or "on" may include directly above in a contact manner or above in a non-contact manner.

Figure 2:
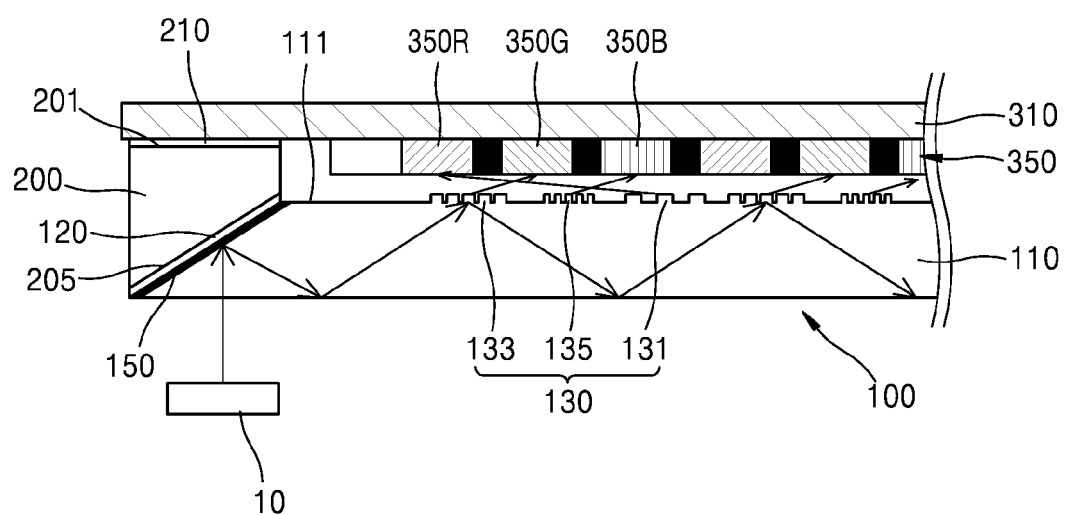
FIG. 2 illustrates a magnified cross-sectional view of a portion of the display apparatus of FIG. 1.

FIG. 1 illustrates a cross-sectional view of a display apparatus including a directional backlight unit, according to an exemplary embodiment. FIG. 2 illustrates a magnified cross-sectional view of a portion of the display apparatus of FIG. 1.

Referring to FIGS. 1 and 2, the display apparatus according to an exemplary embodiment may include a switch panel module 300, a backlight unit 100 for providing light to the switch panel module 300, and an auxiliary structure 200 for assembling the switch panel module 300 and the backlight unit 100.

The switch panel module 300 may form an image and may have a plurality of two-dimensionally (2D) arranged pixel arrays. The switch panel module 300 may also include a display unit 350 and a support part 310.

The plurality of 2D arranged pixel arrays are located in the display unit 350. For example, a red pixel, a green pixel, and a blue pixel may be repetitively arranged in the display unit 350. Each pixel operates as an optical switching element for turning light on or off and is driven to display a desired image. The display unit 350 may include a liquid crystal display, an organic light-emitting device, or the like.

The support part 310 supports the display unit 350 and is a part to which the auxiliary structure 200 is directly or indirectly coupled so as to assemble the switch panel module 300 and the backlight unit 100 and may be a structure extending from the display unit 350 or may be a cover glass attached to the display unit 350. FIG. 1 illustratively shows a case where the support part 310 is a structure extending from the display unit 350, and FIG. 2 illustratively shows a case where the support part 310 is a cover glass attached to the display unit 350.

The backlight unit 100 is a directional backlight unit and may include a light source 10 for emitting light, a light-guide plate 110 for guiding the light from the light source 10, a diffraction lattice element array 130 arranged on an upper surface 111 of the light-guide plate 110, and an input coupler 150 for inputting the light from the light source 10 to the light-guide plate 110.

The light source 10 may be, for example, disposed on at least one side of the light-guide plate 110 so as to input the light from a lower direction of the backlight unit 100 to the input coupler 150. The light incident from the lower direction of the backlight unit 100 to the input coupler 150 may be reflected by the input coupler 150 and input the light-guide plate 110.

Figure 3:
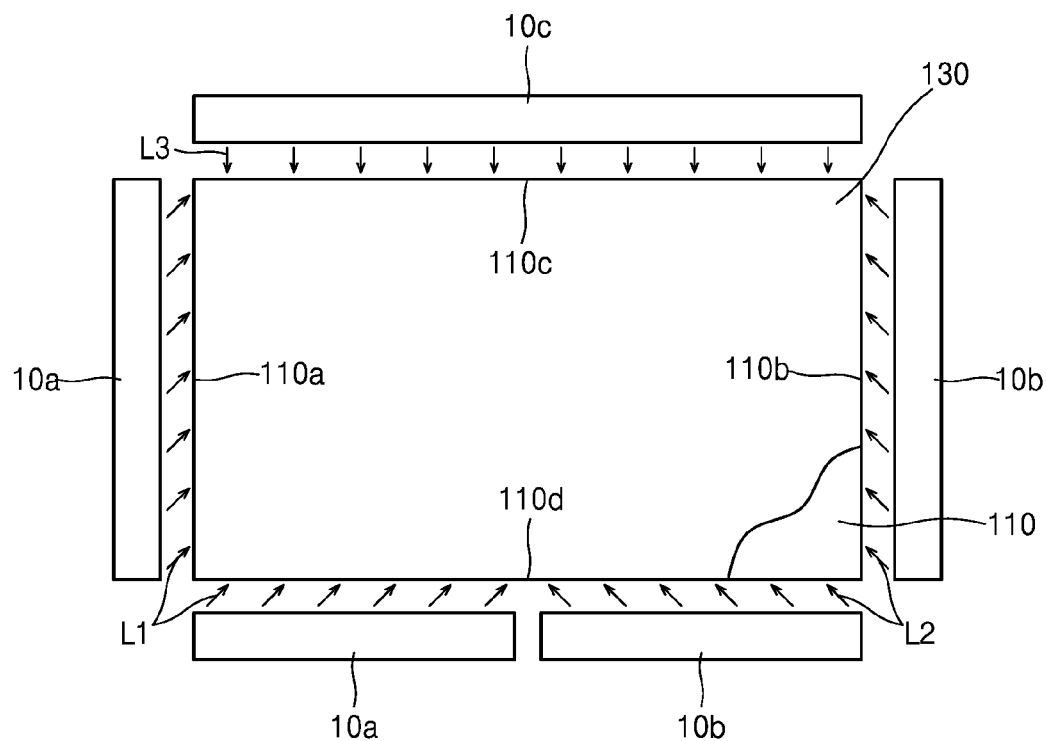
FIG. 3 illustrates a top view of an arrangement structure of a light source in a backlight unit.

FIG. 3 illustrates a top view of an arrangement structure of the light source 10 in the backlight unit 100. In FIG. 3, the input coupler 150 is omitted.

Referring to FIG. 3, for example, the light source 10 may include a first light source 10*a* for emitting light of a first wavelength band, a second light source 10*b* for emitting light of a second wavelength band, and a third light source 10*c* for emitting light of a third wavelength band. For example, the first light source 10*a* may emit red light, the second light source 10b may emit blue light, and the third light source 10c may emit green light. The first light source 10a may include an array of a plurality of red light sources for providing red light. The second light source 10b may include an array of a plurality of blue light sources for providing blue light. The third light source 10c may include an array of a plurality of green light sources for providing green light. Herein, the red light sources, the blue light sources, and the green light sources may include a light-emitting device (LED), a laser device (LD), or the like.

The first light source 10a, the second light source 10b, and the third light source 10c may be arranged so as to input light from the lower direction of the backlight unit 100 to the input coupler 150. The light emitted from the first light source 10a, the second light source 10b, and the third light source 10c may be reflected by the input coupler 150 and input to the light-guide plate 110 through side surfaces of the light-guide plate 110.

The light-guide plate 110 may overall have, for example, a rectangular parallelepiped shape and may have a relatively thin plate shape. The first light source 10a may be disposed at a side of a first incident surface 110a of the light-guide plate 110, the second light source 10b may be disposed at a side of a second incident surface 110b of the light-guide plate 110, and the third light source 10c may be disposed at a side of a third incident surface 110c of the light-guide plate 110. In addition, the first light source 10a and the second light source 10b may be further disposed at a side of a fourth incident surface 110d of the light-guide plate 110. The light-guide plate 110 may include the first incident surface 110a to which light emitted from the first light source 10a and reflected by the input coupler 150 is incident, the second incident surface 110b to which light emitted from the second light source 10b and reflected by the input coupler 150 is incident, and the third incident surface 110c to which light emitted from the third light source 10c and reflected by the input coupler 150 is incident. In addition, the light-guide plate 110 may further include the fourth incident surface 110d to which lights emitted from the first light source 10a and the second light source 10b and reflected by the input coupler 150 are incident. As illustrated in the exemplary embodiments of FIGS. 1 and 2, when the side surfaces of the light-guide plate 110 are formed as inclined surfaces, and the input coupler 150 includes inclined mirror surfaces formed on the inclined surfaces of the side surfaces of the light-guide plate 110, the first, second, third, and fourth incident surfaces 110a, 110b, 110c, and 110d may correspond to the inclined mirror surfaces of the input coupler 150 or the inclined surfaces of the side surfaces of the light-guide plate 110.

The first light source 10a may emit first light L1, the second light source 10b may emit second light L2, and the third light source 10c may emit third light L3. The first light L1 and the second light L2 may be incident at an angle with respect to the light-guide plate 110, and the third light L3 may be perpendicularly incident onto the light-guide plate 110. For example, the first light L1 emitted from the first light source 10a disposed at one side of the light-guide plate 110 may be parallel to the first light L1 emitted from the first light source 10a disposed at another side of the light-guide plate 110. In addition, for example, the second light L2 emitted from the second light source 10b disposed at another one side of the light-guide plate 110 may be parallel to the second light L2 emitted from the second light source 10b disposed at the another side of the light-guide plate 110. Light intensity of the first light L1 and the second light L2 may be further increased according to circumstances by further providing the first light source 10a and the second light source 10b at another side of the light-guide plate 110. In FIG. 3, the first light L1 has a traveling path of being emitted from the first light source 10a, reflected by the input coupler 150, and then incident to the light-guide plate 110, the second light L2 has a traveling path of being emitted from the second light source 10b, reflected by the input coupler 150, and then incident to the light-guide plate 110, and the third light L3 has a traveling path of being emitted from the third light source 10c, reflected by the input coupler 150, and then incident to the light-guide plate 110.

Herein, the arrangement of the light source 10 is not limited to that of FIG. 3 and may vary.

For example, the first light source 10a, the second light source 10b, and the third light source 10c may be alternately arranged at one side of the light-guide plate 110. Alternatively, the first light source 10a, the second light source 10b, and the third light source 10c may be respectively arranged at only three sides of the light-guide plate 110. Alternatively, the first light source 10a, the second light source 10b, the third light source 10c, and a fourth light source (not shown) may be respectively arranged at the four sides of the light-guide plate 110. The fourth light source may emit light of a wavelength other than the red light, the green light, and the blue light or emit further necessary light among the red light, the green light, and the blue light. For example, the fourth light source may emit the green light. As such, when a light source for emitting further necessary light is provided as the fourth light source, the number of light sources having relatively low optical efficiency may be increased to increase light intensity thereof.

The light-guide plate 110 may be provided to guide the light from the light source 10 through total internal reflection, thereby outputting the light through the upper surface 111 of the light-guide plate 110.

Figure 4:
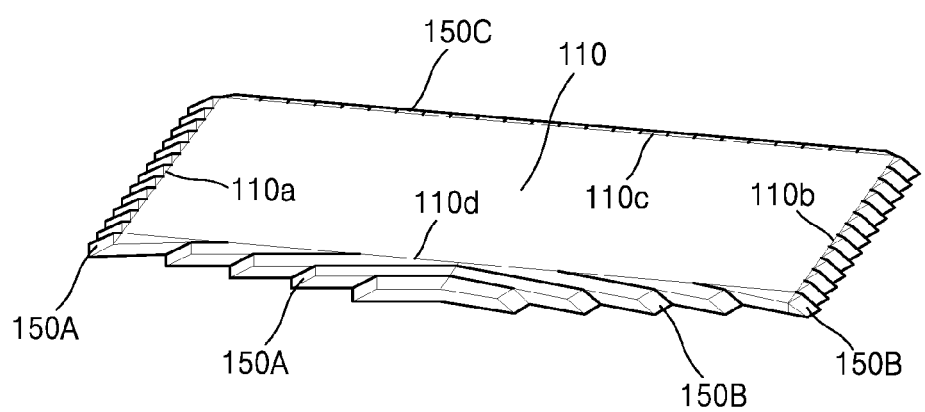
FIG. 4 is a perspective view of a light-guide plate applicable to the backlight unit, according to an exemplary embodiment.

FIG. 4 is a perspective view of the light-guide plate 110 applicable to the backlight unit 100, according to an exemplary embodiment. In FIG. 4, the diffraction lattice element array 130 formed on the upper surface 111 of the light-guide plate 110 is omitted.

Referring to FIG. 4, the light-guide plate 110 may include an array of a plurality of inclined surfaces inclined with respect to the upper surface 111 on at least one side surface thereof.

For example, the light-guide plate 110 may include an array of a plurality of inclined surfaces inclined with respect to the upper surface 111 on each of the first, second, third and fourth incident surfaces 110a, 110b, 110c, and 110d so as to be suitable for the arrangement of the light source 10 of FIG. 3. An inclined mirror surface 150A of the input coupler 150 may be formed on the inclined surface array located on the first incident surface 110a so as to reflect the first light L1 incident from the first light source 10a and to make the first light L1 travel towards the light-guide plate 110. An inclined mirror surface 150B of the input coupler 150 may be formed on the inclined surface array located on the second incident surface 110b so as to reflect the second light L2 incident from the second light source 10b and to make the second light L2 travel towards the light-guide plate 110. An inclined mirror surface 150C of the input coupler 150 may be formed on the inclined surface array located on the third incident surface 110c so as to reflect the third light L3 incident from the third light source 10c and to make the third light L3 travel towards the light-guide plate 110. The inclined mirror surface 150A of the input coupler 150 so as to reflect the first light L1 incident from the first light source 10a and to make the first light L1 travel towards the light-guide plate 110 and the inclined mirror surface 150B of the input coupler 150 so as to reflect the second light L2 incident from the second light source 10b and to make the second light L2 travel towards the light-guide plate 110 may be formed on the inclined surface array located on the fourth incident surface 110d.

The light reflected by the input coupler 150 and incident inside the light-guide plate 110 may be output through the upper surface 111 of the light-guide plate 110 by the diffraction lattice element array 130 arranged on the upper surface 111 of the light-guide plate 110 while being total internally reflected between the upper surface 111 and a lower surface of the light-guide plate 110.

Referring back to FIGS. 1 and 2, the diffraction lattice element array 130 may be formed on the upper surface 111 of the light-guide plate 110. The diffraction lattice element array 130 may be formed by patterning the upper surface 111 of the light-guide plate 110, formed by forming an additional layer on the upper surface 111 of the light-guide plate 110 and patterning the additional layer, or obtained by attaching a diffraction lattice element array sheet manufactured in a film shape to the upper surface 111 of the light-guide plate 110.

A plurality of diffraction lattice elements 131, 133, and 135 arranged on the upper surface 111 of the light-guide plate 110 may be arranged in a 2D array form as a plurality of pixels 350R, 350G, and 350B of the display unit 350 of the switch panel module 300. For example, the display unit 350 of the switch panel module 300 may include the plurality of pixels 350R, 350G, and 350B arranged as a 2D array, and the plurality of diffraction lattice elements 131, 133, and 135 arranged on the upper surface 111 of the light-guide plate 110 may be arranged in a 2D array form as the plurality of pixels 350R, 350G, and 350B of the switch panel module 300 and one-to-one correspond to the plurality of pixels 350R, 350G, and 350B of the switch panel module 300, respectively. For example, the plurality of pixels 350R, 350G, and 350B of the switch panel module 300 may include a red pixel 350R, a green pixel 350G, and a blue pixel 350B, and a first diffraction lattice element 131 may be disposed to face the red pixel 350R, a second diffraction lattice element 133 may be disposed to face the green pixel 350G, and a third diffraction lattice element 135 may be disposed to face the blue pixel 350B. The first, second, and third diffraction lattice elements 131, 133, and 135 may have different periodical diffraction lattice patterns, respectively. An arrangement direction, a pitch, a width, a height and the like of diffraction lattices may be determined such that the first, second, and third diffraction lattice elements 131, 133, and 135 output red light, green light, and blue light to desired directions by diffracting the red light, the green light, and the blue light, respectively.

Herein, a red filter for passing only light of a red band may be disposed on the red pixel 350R of the switch panel module 300, a green filter for passing only light of a green band may be disposed on the green pixel 350G of the switch panel module 300, and a blue filter for passing only light of a blue band may be disposed on the blue pixel 350B of the switch panel module 300. In addition, a black matrix (BM) may be disposed between two adjacent pixels.

The input coupler 150 is provided at a side surface of the light-guide plate 110 to input light from the light source 10 to the light-guide plate 110 and is fixed to the light-guide plate 110.

The input coupler 150 includes an inclined mirror surface inclined with respect to the upper surface 111 of the light-guide plate 110 so as to reflect the light from the light source 10 and to input the reflected light to the light-guide plate 110.

As shown in FIGS. 1 and 2, when an inclined surface inclined with respect to the upper surface 111 is provided on at least one side surface of the light-guide plate 110, the input coupler 150 may be an inclined mirror surface provided on the inclined surface of the light-guide plate 110.

As shown in FIG. 4, when a plurality of inclined surfaces inclined with respect to the upper surface 111 are provided as an array on at least one side surface of the light-guide plate 110, the input coupler 150 may include the inclined mirror surfaces 150A, 150B, and 150C respectively provided on a plurality of inclined surface arrays.

Figure 5:
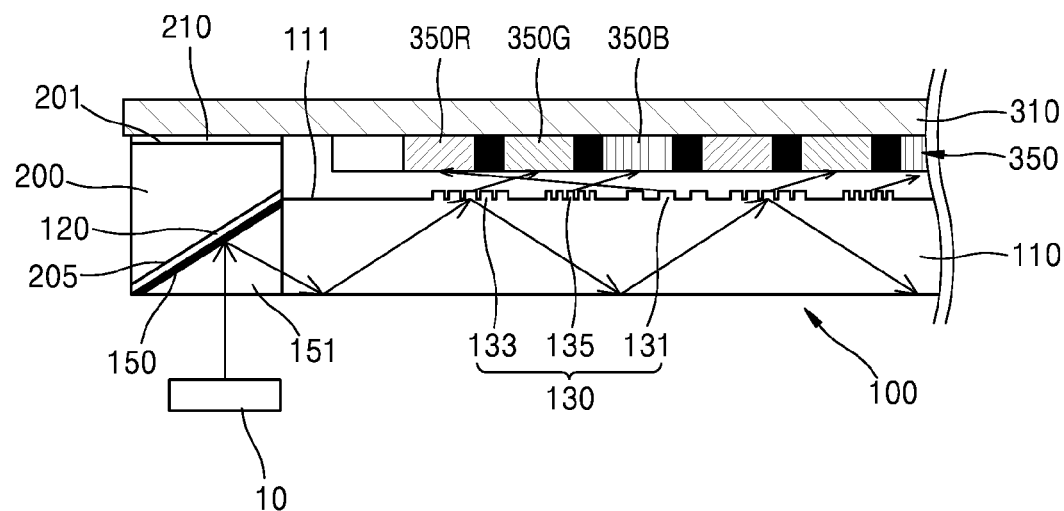
FIG. 5 illustrates a cross-sectional view of a display apparatus including a directional backlight unit, according to another exemplary embodiment.

As shown in FIG. 5, the input coupler 150 may include a block 151 having an inclined mirror surface inclined with respect to the upper surface 111 of the light-guide plate 110, which is attached to at least one side surface of the light-guide plate 110. Herein, the input coupler 150 may include an array of blocks 151 having an inclined mirror surface inclined with respect to the upper surface 111 of the light-guide plate 110, which is attached to at least one side surface of the light-guide plate 110. That is, a plurality of input couplers 150 attached as an array to at least one side surface of the light-guide plate 110 may be provided.

Referring to FIGS. 1, 2, and 5, the auxiliary structure 200 may be coupled to the input coupler 150 and the switch panel module 300 for assembling the switch panel module 300 and the backlight unit 100.

The auxiliary structure 200 may have an inclined surface 205 coupled to an inclined mirror surface of the input coupler 150. In addition, the auxiliary structure 200 may have, on an upper part thereof, an upper horizontal surface 201 that is parallel to the switch panel module 300.

In this case, the inclined mirror surface of the input coupler 150 and the inclined surface 205 of the auxiliary structure 200 may be bonding-coupled by an adhesive 120. In addition, the upper horizontal surface 201 of the auxiliary structure 200 is directly or indirectly fixed to the support part 310 of the switch panel module 300. For example, the upper horizontal surface 201 of the auxiliary structure 200 and the support part 310 of the switch panel module 300 may be bonding-coupled by an adhesive 210. In other words, the inclined mirror surface of the input coupler 150 and the inclined surface 205 of the auxiliary structure 200, and the upper horizontal surface 201 of the auxiliary structure 200 and the switch panel module 300 may be bonding-coupled by the adhesives 120 and 210, respectively.

As shown in FIG. 4, when a plurality of input couplers 150 are provided as an array on at least one surface of the light-guide plate 110, the auxiliary structure 200 may be provided so as to be coupled to inclined mirror surfaces of at least some of the plurality of input couplers 150. For example, the auxiliary structure 200 may be provided plural in number so as to be one-to-one coupled to the plurality of input couplers 150 or provided as a single body including a plurality of inclined surfaces 205 respectively one-to-one coupled to the plurality of input couplers 150.

Figure 6:
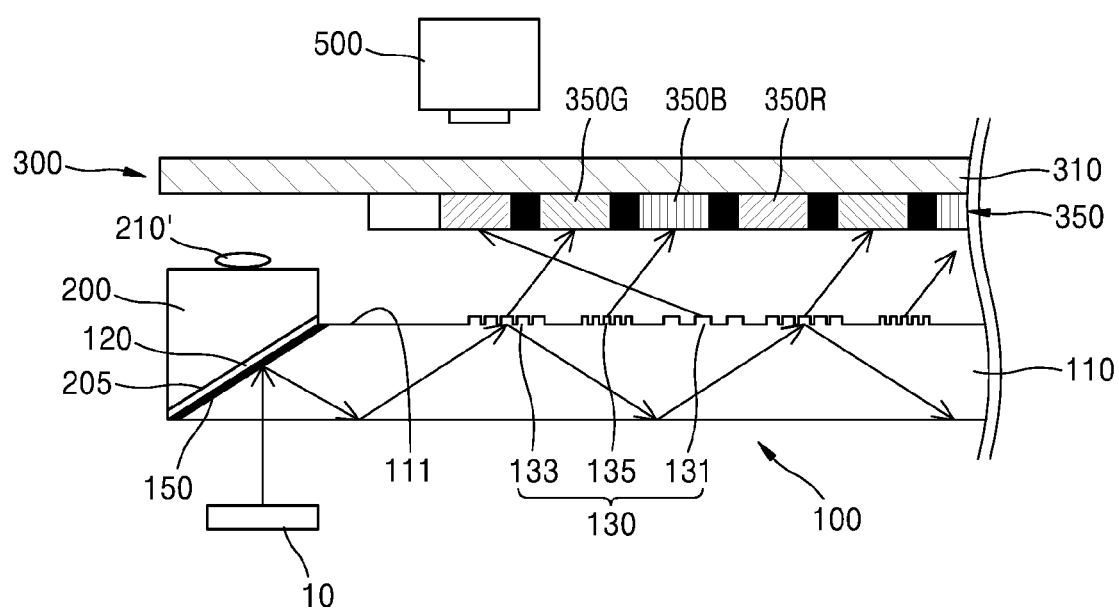
FIGS. 6, 7, 8, 9, 10, and 11 illustrate cross-sectional views for describing methods of assembling a display apparatus, according to exemplary embodiments.

FIG. 6 illustrates a cross-sectional view for describing a method of assembling a display apparatus, according to an exemplary embodiment.

As shown in FIG. 6, when the support part 310 of the switch panel module 300 is formed of cover glass, and the display unit 350 protrudes downwards with respect to the support part 310, the auxiliary structure 200 may be provided such that the upper horizontal surface 201 protrudes upwards with respect to the upper surface 111 of the light-guide plate 110 so as to prevent collision between the switch panel module 300 and the backlight unit 100.

Referring to FIG. 6, the auxiliary structure 200 may be first coupled to the input coupler 150 by bonding-coupling between the inclined surface 205 of the auxiliary structure 200 and the inclined mirror surface of the input coupler 150 by the adhesive 120 so as to assemble the switch panel module 300 and the backlight unit 100 by respectively bonding-coupling between the inclined surface 205 of the auxiliary structure 200 and the inclined mirror surface of the input coupler 150 and between the upper horizontal surface 201 of the auxiliary structure 200 and the switch panel module 300 by adhesives. Thereafter, the switch panel module 300 and the upper horizontal surface 201 of the auxiliary structure 200 may be bonded, coupled, and fixed by the adhesive 210 by adding an adhesive 210' to the upper horizontal surface 201 of the auxiliary structure 200 and hardening the adhesive 210', for example, through irradiation of ultraviolet rays in a state in which relative horizontal locations of the switch panel module 300 and the backlight unit 100 are adjusted using an aligner microscope 500 such that the pixels 350R, 350G, and 350B of the switch panel module 300 and the first, second, and third diffraction lattice elements 131, 133, and 135 are aligned in a state of making the support part 310 of the switch panel module 300 approach the upper horizontal surface 201 of the auxiliary structure 200.

When the assembling process according to the present exemplary embodiment is applied, fine alignment of pixels may be performed through bonding-coupling using the adhesives 120 and 210, thereby enabling to implement a high-resolution 3D image, and a diffraction angle variation may be prevented by adjusting a gap between the diffraction lattice element array 130 and the switch panel module 300, thereby minimizing crosstalk. In addition, an assembling location between the switch panel module 300 and the backlight unit 100 is located in an external space of the light-guide plate 110 instead of being located on a light traveling path of the light-guide plate 110, and thus, the possibility of an optical loss which may occur by coating an adhesive or the like on the light-guide plate 110 during assembling may be removed. In addition, a space on an input wedge is used to assemble the switch panel module 300 and the backlight unit 100 by applying the input coupler 150 having inclined mirror surfaces to the side surfaces of the light-guide plate 110, and thus, a separate space for the assembling is not required, thereby significantly reducing a size of the display apparatus.

Figure 12:
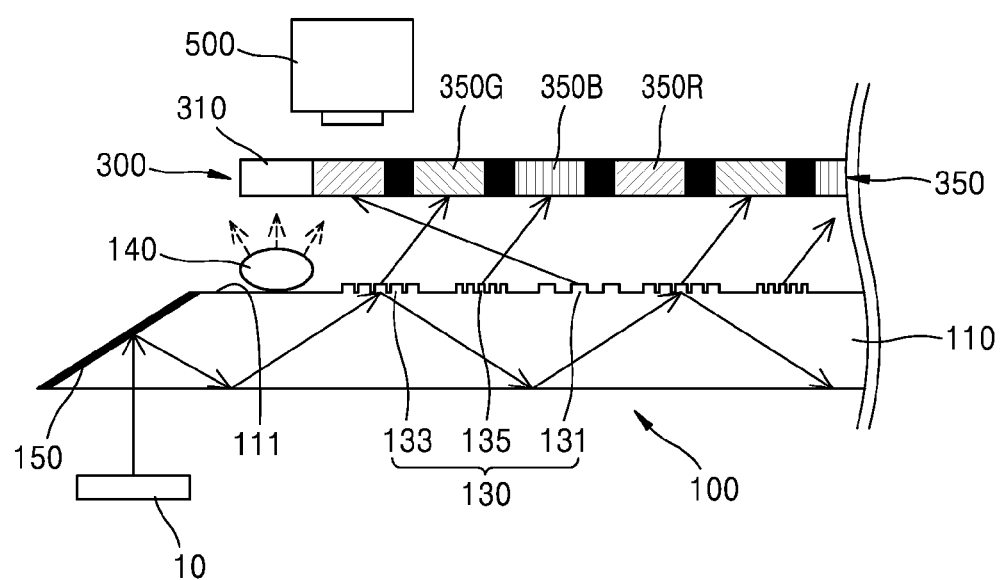
FIG. 12 illustrates a cross-sectional view for describing a process of assembling a display apparatus, according to a comparative example.

FIG. 12 illustrates a cross-sectional view for describing a process of assembling a display apparatus, according to a comparative example.

Unlike the exemplary embodiments described above, the display apparatus according to the comparative example does not include the auxiliary structure 200, wherein an adhesive 140 is coated on the upper surface 111 of the light-guide plate 110 to assemble the switch panel module 300 and the backlight unit 100. As such, when the adhesive 140 is coated on the upper surface 111 of the light-guide plate 110 and is hardened by irradiating thereon, for example, ultraviolet rays in a state of making the support part 310 of the switch panel module 300 approach the light-guide plate 110, the switch panel module 300 may be fixed to the light-guide plate 110. In this case, since a refractive index difference between the light-guide plate 110 and the adhesive 140 is less than a refractive index difference between the light-guide plate 110 and air, an optical loss may occur at a region where the adhesive 140 is located.

The display apparatus and a method of assembling the same, according to one or more exemplary embodiments, have been described by illustrating a case where the support part 310 of the switch panel module 300 is formed of cover glass, and the upper horizontal surface 201 of the auxiliary structure 200 is formed to protrude with respect to the upper surface 111 of the light-guide plate 110, but a shape and an assembling method of the auxiliary structure 200 may be variously modified.

FIGS. 7 through 10 illustrate cross-sectional views of display apparatuses and methods of assembling the same, according to other exemplary embodiments.

Referring to FIGS. 7 through 10, in the display apparatuses, the support part 310 of the switch panel module 300 may be formed in a structure of extending from the display unit 350.

Figure 7:
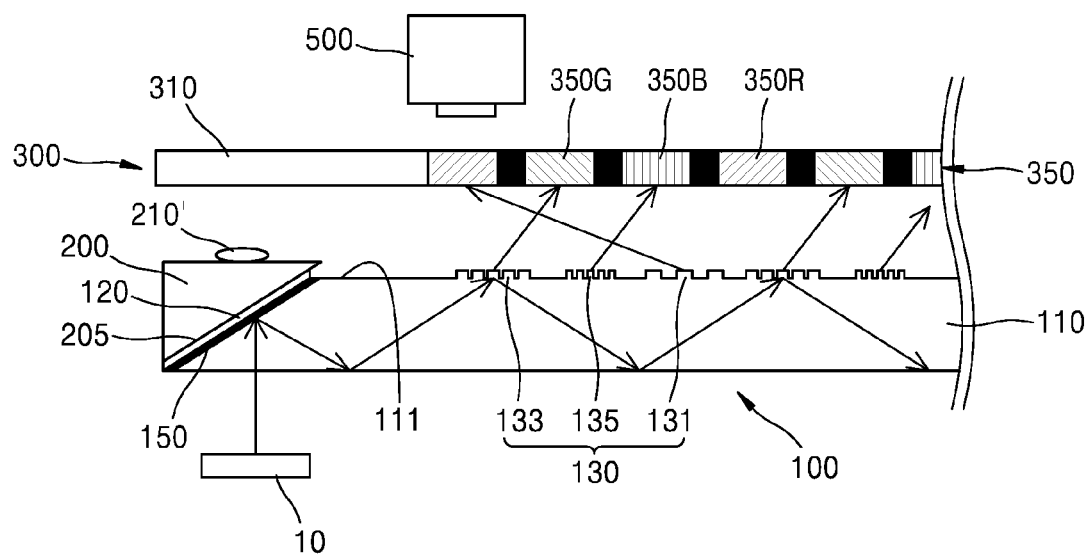
Figure 8:
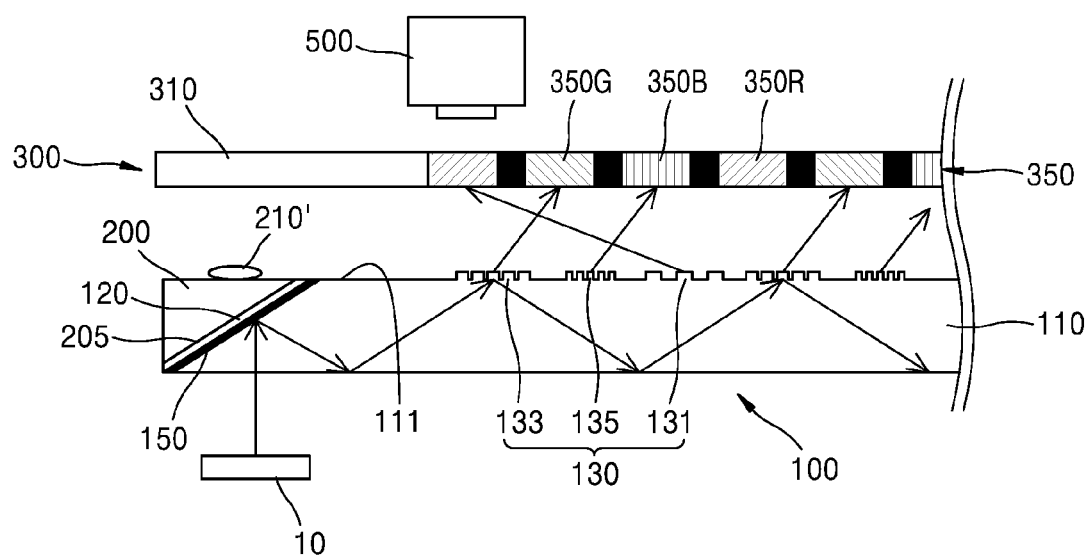

FIGS. 7 and 8 illustrate exemplary embodiments in which the switch panel module 300 and the backlight unit 100 are assembled in a state in which the auxiliary structure 200 is fixed to the input coupler 150 by bonding-coupling the inclined surface 205 of the auxiliary structure 200 with the inclined mirror surface of the input coupler 150.

Referring to FIG. 7, the upper horizontal surface 201 of the auxiliary structure 200 may be formed to protrude from the upper surface 111 of the light-guide plate 110. Referring to FIG. 8, the upper horizontal surface 201 of the auxiliary structure 200 may be formed to be in the same height as the upper surface 111 of the light-guide plate 110.

When the adhesive 210' is added to the upper horizontal surface 201 of the auxiliary structure 200 so as to assemble the switch panel module 300 and the backlight unit 100, as shown in FIGS. 7 and 8, in a state in which the auxiliary structure 200 is fixed to the input coupler 150 by bonding-coupling the inclined surface 205 of the auxiliary structure 200 with the inclined mirror surface of the input coupler 150 by the adhesive 120, and the adhesive 210' is hardened, for example, through irradiation of ultraviolet rays while adjusting relative horizontal locations of the switch panel module 300 and the backlight unit 100 so as to align the pixels 350R, 350G, and 350B of the switch panel module 300 and the first, second, and third diffraction lattice elements 131, 133, and 135 by using the aligner microscope 500 in a state of making the support part 310 of the switch panel module 300 approach the upper horizontal surface 201 of the auxiliary structure 200, the switch panel module 300 may be fixed to the upper horizontal surface 201 of the auxiliary structure 200.

Figure 9:
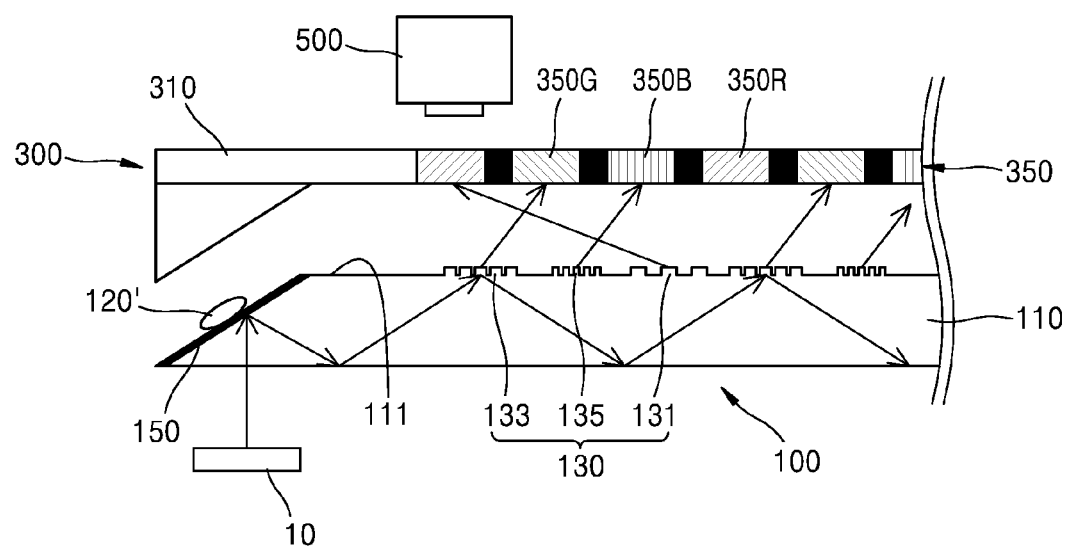
Figure 10:
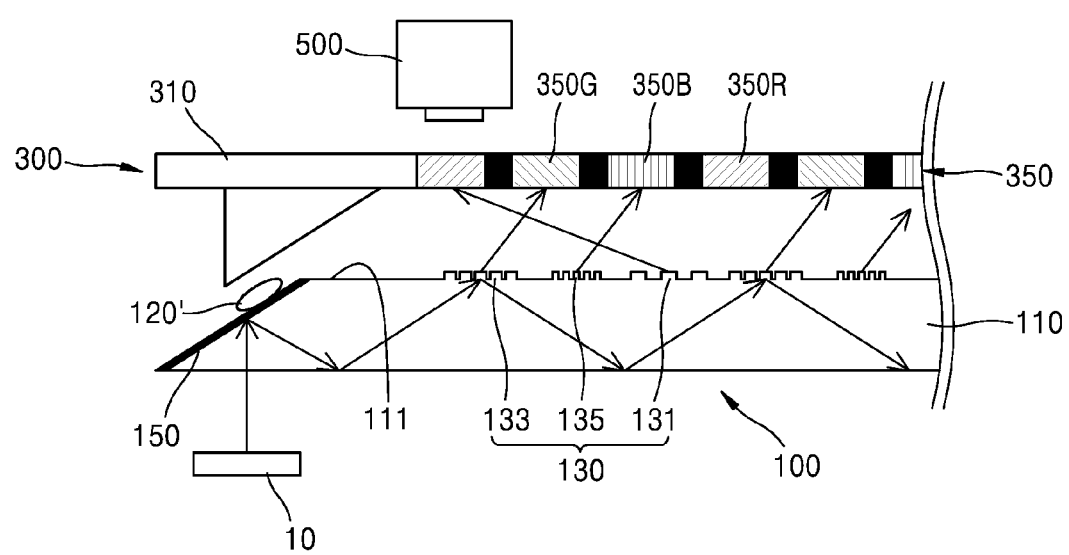

FIGS. 9 and 10 illustrate exemplary embodiments in which the switch panel module 300 and the backlight unit 100 are assembled in a state in which the upper horizontal surface 201 of the auxiliary structure 200 is fixed to the support part 310 of the switch panel module 300.

Comparing FIG. 9 with FIG. 10, horizontal locations where the auxiliary structure 200 is fixed to the support part 310 of the switch panel module 300 are different from each other. As such, a gap between the switch panel module 300 and the backlight unit 100 may be adjusted by adjusting a location of the auxiliary structure 200.

When an adhesive 120' is coated on the inclined mirror surface of the input coupler 150 so as to assemble the switch panel module 300 and the backlight unit 100, as shown in FIGS. 9 and 10, in a state in which the upper horizontal surface 201 of the auxiliary structure 200 is fixed to the support part 310 of the switch panel module 300, and the adhesive 120' is hardened, for example, through irradiation of ultraviolet rays while adjusting relative horizontal locations of the switch panel module 300 and the backlight unit 100 so as to align the pixels 350R, 350G, and 350B of the switch panel module 300 and the first, second, and third diffraction lattice elements 131, 133, and 135 by using the aligner microscope 500 in a state of making the inclined surface 205 of the auxiliary structure 200 approach the inclined mirror surface of the input coupler 150, the inclined mirror surface of the input coupler 150 may be fixed to the inclined surface 205 of the auxiliary structure 200.

Although exemplary embodiments in which the support part 310 of the switch panel module 300 is formed in a structure of extending from the display unit 350 have been described with reference to FIGS. 7 through 10, the exemplary embodiments are only illustrative, and the support part 310 of the switch panel module 300 in FIGS. 7 through 10 may be formed of cover glass.

Figure 11:
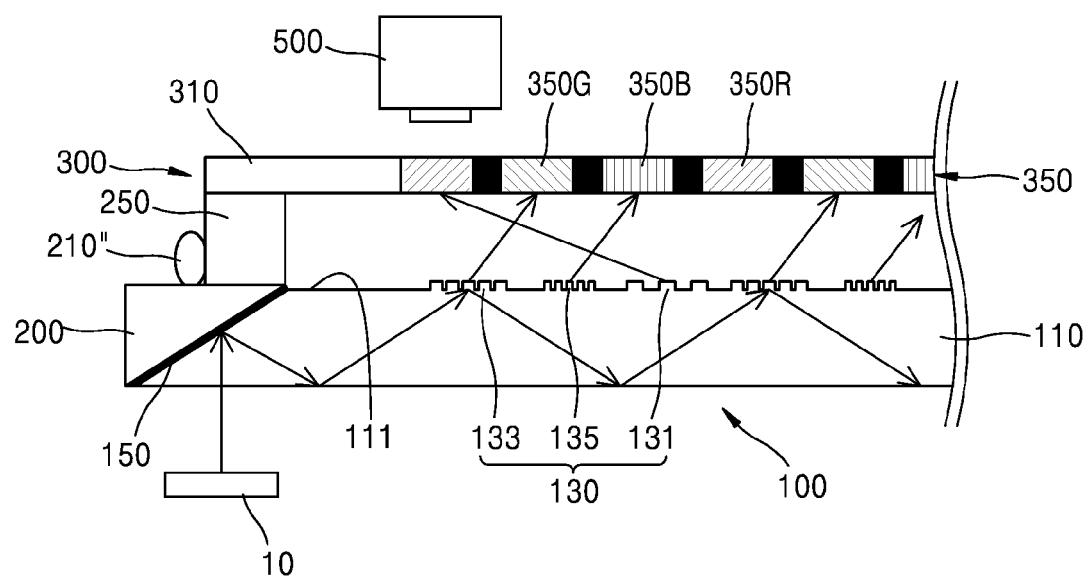

FIG. 11 illustrates a cross-sectional view for describing a display apparatus and a method of assembling the same, according to another exemplary embodiment. The display apparatus of FIG. 11 includes the support part 310 of the switch panel module 300, which is formed of cover glass, as shown in FIG. 6.

Compared with the display apparatus of FIG. 6, the display apparatus of FIG. 11 differs from the display apparatus of FIG. 6 in that the upper horizontal surface 201 of the auxiliary structure 200 is formed in the same height as the upper surface 111 of the light-guide plate 110.

FIG. 11 shows an example in which the upper horizontal surface 201 of the auxiliary structure 200 is formed in the same height as the upper surface 111 of the light-guide plate 110, and the support part 310 of the switch panel module 300 is fixed to the input coupler 150 by interposing an additional auxiliary structure 250 therebetween.

As shown in FIG. 11, when the additional auxiliary structure 250 is used, the additional auxiliary structure 250 may be disposed between the upper horizontal surface 201 of the auxiliary structure 200 and the support part 310 of the switch panel module 300 so as to assemble the switch panel module 300 and the backlight unit 100 in a state in which the auxiliary structure 200 is fixed to the input coupler 150 by bonding-coupling the inclined surface 205 of the auxiliary structure 200 with the inclined mirror surface of the input coupler 150 by the adhesive 120 and the additional auxiliary structure 250 is fixed to the support part 310 of the switch panel module 300, an adhesive 210" may be added to the upper horizontal surface 201 of the auxiliary structure 200 and a side surface of the additional auxiliary structure 250, and the adhesive 210" may be hardened by irradiating thereon, for example ultraviolet rays while adjusting relative horizontal locations of the switch panel module 300 and the backlight unit 100 so as to align the pixels 350R, 350G, and 350B of the switch panel module 300 and the first, second, and third diffraction lattice elements 131, 133, and 135 by using the aligner microscope 500, thereby fixing between the additional auxiliary structure 250 and the auxiliary structure 200.

Although the exemplary embodiments in which a side surface of the light-guide plate 110 is formed to have an inclined surface and the input coupler 150 is an inclined mirror surface formed on the inclined surface on the side surface of the light-guide plate 110 have been described with reference to FIGS. 6 through 11, the exemplary embodiments are only illustrative, and as described above with reference to FIG. 5, the input coupler 150 including the block 151 having an inclined mirror surface may also be applied to FIGS. 6 through 11.

According to the display apparatus and the method of assembling the same, according to the exemplary embodiments described above, the diffraction lattice-based directional backlight unit 100 is applied, and assembling the backlight unit 100 and the switch panel module 300 is obtained by disposing the auxiliary structure 200 between the inclined mirror surface of the input coupler 150 and the switch panel module 300, and thus a gap may be adjusted according to a fixed location change, a size, and a shape of the auxiliary structure 200, and fine alignment of pixels may be performed by bonding-coupling using an adhesive, and thus a high-resolution 3D image may be implemented. In addition, as described above, crosstalk may be minimized, and an assembling location between the switch panel module 300 and the backlight unit 100 is located in an external space of the light-guide plate 110, and thus the possibility of an optical loss which may occur by coating the adhesive 140 or the like on the light-guide plate 110 during assembling may be removed, and a space on an input wedge is used to assemble the switch panel module 300 and the backlight unit 100, and thus, a separate space for the assembling is not required, thereby significantly reducing a size of the display apparatus.

According to the display apparatus and the method of assembling the same, according to the exemplary embodiments described above, through precise assembling of the diffraction lattice-based directional backlight unit 100 and the switch panel module 300, a high-resolution 3D image may be implemented, the assembling may be performed by securing a location where the directional backlight unit 100 and the switch panel module 300 may be bonded without an optical loss, an alignment error between the pixels 350R, 350G, and 350B of the switch panel module 300 and the first, second, and third diffraction lattice elements 131, 133, and 135 may be reduced by bonding-coupling using an adhesive, and crosstalk due to light spread in the diffraction lattice element array 130 may be prevented by adjusting a gap between the backlight unit 100 and the switch panel module 300.

According to a display apparatus employing a directional backlight unit and a method of assembling the same according to one or more exemplary embodiments, an auxiliary structure coupled to an input coupler and a switch panel module is applied, and thus, a light-guide plate and the switch panel module may be assembled without affecting total internal reflection.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A display apparatus comprising:
a switch panel;
a backlight comprising:
  a light source,
  a light-guide plate configured to guide light from the light source through total internal reflection,
  an array of diffraction lattice elements provided on an upper surface of the light-guide plate and configured to output the light from the light source to the switch panel through the upper surface of the light guide plate, and an input coupler provided on a side surface of the light-guide plate, configured to input the light from the light source to the light-guide plate, and fixed to the light-guide plate so as to provide the light from the light source to the switch panel; and an auxiliary structure coupled to the input coupler and the switch panel so as to fix the switch panel to the backlight.

2. The display apparatus of claim 1, wherein the input coupler comprises an inclined mirror surface inclined with respect to the upper surface of the light-guide plate so as to input the light from the light source to the light-guide plate by reflecting the light from the light source.

3. The display apparatus of claim 2, wherein the light source is disposed such that the light from the light source is incident to the inclined mirror surface of the input coupler from behind the backlight.

4. The display apparatus of claim 2, wherein the auxiliary structure has an inclined surface coupled to the inclined mirror surface of the input coupler.

5. The display apparatus of claim 4, wherein the inclined mirror surface of the input coupler and the inclined surface of the auxiliary structure are bonding-coupled by an adhesive.

6. The display apparatus of claim 4, wherein the auxiliary structure has an upper horizontal surface parallel to the switch panel.

7. The display apparatus of claim 6, wherein the upper horizontal surface of the auxiliary structure and a support part of the switch panel are bonding-coupled by an adhesive.

8. The display apparatus of claim 6, wherein the upper horizontal surface of the auxiliary structure is fixed to a support part of the switch panel.

9. The display apparatus of claim 1, wherein the input coupler comprises an array of a plurality of input couplers on at least one side surface of the light-guide plate, each of the plurality of input couplers has an inclined mirror surface inclined with respect to the upper surface of the light guide plate, and the auxiliary structure is coupled to the inclined mirror surface of at least one of the plurality of input couplers.

10. The display apparatus of claim 1, wherein an array of a plurality of inclined surfaces inclined with respect to the upper surface of the light guide plate are provided on at least one side surface of the light-guide plate, and the input coupler comprises an inclined mirror surface corresponding to each of the plurality of inclined surfaces forming the array.

11. The display apparatus of claim 1, wherein the input coupler comprises an array of a plurality of input couplers attached to at least one side surface of the light-guide plate, and each of the plurality of input couplers has an inclined mirror surface inclined with respect to the upper surface of the light-guide plate.

12. The display apparatus of claim 1, wherein the input coupler has an inclined mirror surface inclined with respect to the upper surface of the light-guide plate, the auxiliary structure has an inclined surface coupled to the inclined mirror surface of the input coupler and an upper horizontal surface coupled to the switch panel, and the inclined surface of the auxiliary structure and the inclined mirror surface of the input coupler, and the upper horizontal surface of the auxiliary structure and the switch panel, are bonding-coupled by an adhesive.

13. The display apparatus of claim 12, wherein the upper horizontal surface of the auxiliary structure is located either at a same height as the upper surface of the light-guide plate, or so as to protrude with respect to the upper surface of the light-guide plate.

14. The display apparatus of claim 12, wherein the upper horizontal surface of the auxiliary structure is fixed to the switch panel, and the inclined surface of the auxiliary structure and the inclined mirror surface of the input coupler are bonding-coupled by the adhesive.

15. The display apparatus of claim 1, wherein the auxiliary structure is coupled to the input coupler outside of a location where light reflected by the input coupler to the light-guide plate first arrives at the upper surface of the light-guide plate.

16. A method of assembling the display apparatus of claim 1, the method comprising:

fixing the auxiliary structure to the input coupler by bonding-coupling an inclined surface of the auxiliary structure to an inclined mirror surface of the input coupler by an adhesive, wherein the inclined mirror surface of the input coupler is inclined with respect to an upper surface of the light-guide plate, and the inclined surface of the auxiliary structure is coupled to the inclined mirror surface of the input coupler, and wherein an upper horizontal surface of the auxiliary structure is parallel to the switch panel module;

applying an adhesive to the upper horizontal surface of the auxiliary structure; and fixing the switch panel to the upper horizontal surface of the auxiliary structure by hardening the adhesive in a state of making a support part of the switch panel approach the upper horizontal surface of the auxiliary structure, so as to fix the backlight to the switch panel.

17. A method of assembling the display apparatus of claim 1, the method comprising:

applying an adhesive to an inclined mirror surface of the input coupler in a state of fixing an upper horizontal surface of the auxiliary structure to the switch panel, wherein the inclined mirror surface of the input coupler is inclined with respect to an upper surface of the light-guide plate, and an inclined surface of the auxiliary structure is coupled to the inclined mirror surface of the input coupler, and wherein the upper horizontal surface of the auxiliary structure is parallel to the switch panel; and fixing the inclined surface of the auxiliary structure to the inclined mirror surface of the input coupler by hardening the adhesive in a state of making the inclined surface of the auxiliary structure approach the inclined mirror surface of the input coupler, so as to fix the backlight to the switch panel.

* * * * *